Aug. 7, 1923.

F. H. STOCKING ET AL 1,463,853

HAND OPERATING CONTROLLING DEVICE FOR AUTOMOBILES

Filed Jan. 25, 1919     2 Sheets-Sheet 1

Inventors
F. H. Stocking and
W. M. Farrow Sr.

By    R. P. Wright   Attorney

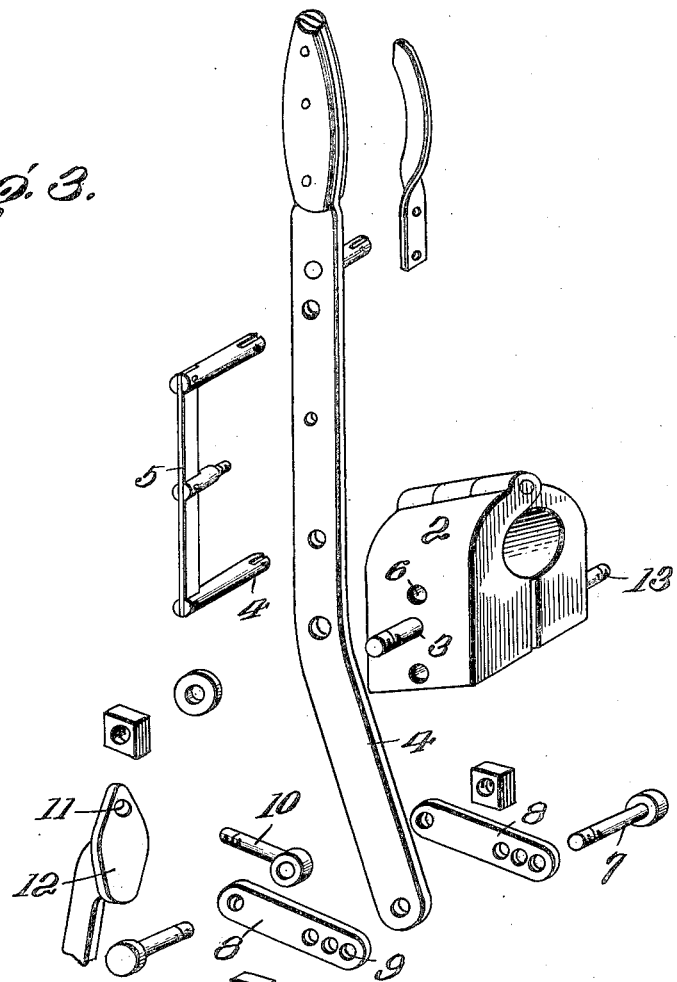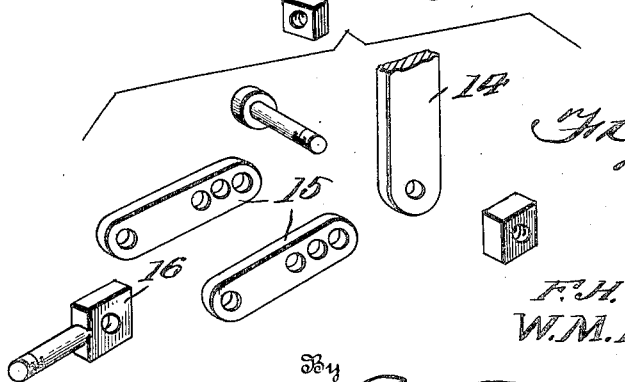

Patented Aug. 7, 1923.

1,463,853

UNITED STATES PATENT OFFICE.

FANNY H. STOCKING AND WILLARD M. FARROW, SR., OF WASHINGTON, DISTRICT OF COLUMBIA.

HAND-OPERATING CONTROLLING DEVICE FOR AUTOMOBILES.

Application filed January 25, 1919. Serial No. 273,127.

*To all whom it may concern:*

Be it known that we, FANNY H. STOCKING and WILLARD M. FARROW, Sr., citizens of the United States, residing at Washington, in the District of Columbia, have invented certain new and useful Improvements in Hand-Operating Controlling Devices for Automobiles, of which the following is a specification, reference being had therein to the accompanying drawing.

This invention relates to certain new and useful improvements in controlling devices for automobiles, the object being to provide hand operated means for shifting the pedals, whereby a legless person can operate the automobile.

Another object of our invention is to provide a control consisting of a pair of levers so constructed that they can be readily applied to an automobile of the Ford type, without changing the construction in any way, whereby the clutch and reverse pedals can be manipulated easily by the hands of the operator.

Another and further object of our invention is to provide novel means for mounting the levers on the steering post, in such position that they can be readily manipulated by hand and at the same time the connection with the pedals is such that they do not interfere with the operation of the pedals by the feet.

Other and further advantages and objects of the invention will be hereinafter set forth and the novel features thereof defined by the appending claims.

In the drawings:

Figure 3 is a perspective view of the support, and one of the hand operated levers and the connections, and Figure 4 is a detail perspective view of the lower portion of the other hand operated lever, and the members for connecting the same to the reverse pedals.

Figure 1:
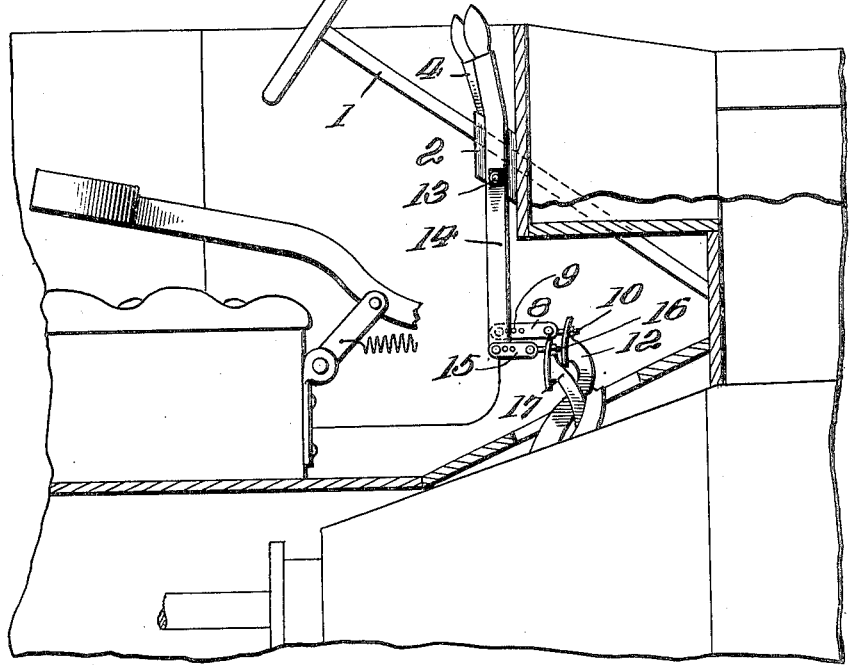
Figure 1 is a longitudinal vertical section through a portion of an automobile, showing the application of our control thereto.
Figure 2:
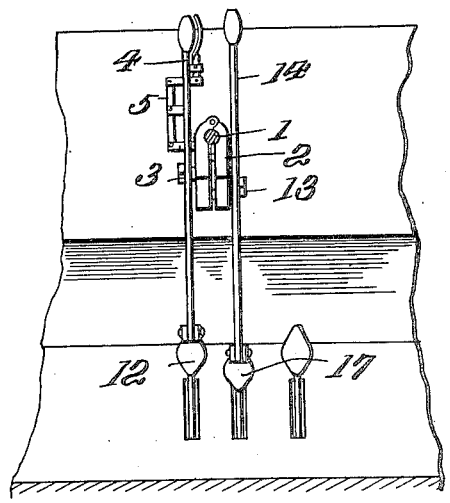
Figure 2 is an elevation of the control attached.

In carrying out our invention, a sectional supporting member 2 is mounted on the steering post 1 of the automobile, said member comprising a pair of pivoted sections adapted to be clamped together around the post, in such a manner that it can be readily attached or detached therefrom.

Extending outwardly from the supporting member 2 is a bearing stud 3 on which is pivotally mounted a lever 4 which is provided with a detent 5 adapted to co-operate with a recess 6 in the supporting member for holding the lever in neutral position. The lower end of the lever 4 is apertured through which a bolt 7 is adapted to pass, on which are mounted links 8 provided with a series of openings 9 in order to allow the same to be adjusted thereon. Pivotally mounted between the free ends of the links 8 is a bolt 10 adapted to be screwed into a threaded bore 11 of the clutch pedal 12 of the automobile, and it will be seen by this construction the hand lever is connected to the clutch pedal in such a manner that the same can be readily operated.

Extending outwardly from the opposite side of the supporting member 2 is a bearing stud 13 on which is pivotally mounted a hand lever 14 carrying a pair of links 15 at its lower end, between which is mounted a bolt 16 adapted to be secured in a threaded bore formed in the reverse pedal 17 of the automobile in order to allow the same to be readily operated. It will be seen that both levers are pivotally mounted on the support under the steering wheel in such a position that they can be readily manipulated, each lever being adjustably connected to its pedal, so that after the device has been attached, the parts can be adjusted so that the pedals will be operated properly.

This application is a companion application of an application filed on even date herewith, and in Figure 1 we have shown the arm control for the brake pedal, and when the attachments are applied as shown in Figure 1, a Ford type of automobile which employs a transmission clutch can be readily manipulated by a legless person with little exertion, as the levers are so mounted and connected to the pedals that they can be shifted easily and without interfering with the steering of the motor vehicle.

While we have shown in the drawing the support secured to the steering post, it is of course understood that the same can be mounted upon the body of the motor vehicle, without departing from the spirit of our invention, and we do not wish to limit ourselves to the details of construction shown.

What we claim is:

1. In a motor vehicle having a steering post and a clutch and reverse pedal arranged beneath the same, of a support formed of two sections pivotally connected together and secured to the steering post, said support having bearing studs, levers pivotally mounted on said bearing studs, detents carried by said levers cooperating with recesses formed in said support, bolts adjustably mounted within said pedals and adjustable links connecting said bolts to the lower ends of said levers.

2. An automobile having a transmission clutch pedal and a reverse pedal and a steering post arranged above the same, a support fixed to said steering post having oppositely disposed bearings, a pair of levers pivotally mounted on said bearings, one of said levers being provided with a detent cooperating with the recess of said support, said pedals being provided with threaded bores, bolts mounted in said bores having apertured heads, links arranged on each side of said head and secured thereto by transverse bolts, said links being provided with a series of openings and bolts extending through said openings and the lower ends of said levers forming adjustable means for connecting said levers to said pedals.

In testimony whereof we hereunto affix our signatures.

FANNY H. STOCKING.
WILLARD M. FARROW, Sr.